(12) United States Patent
Fernholz et al.

(10) Patent No.: US 8,114,239 B2
(45) Date of Patent: Feb. 14, 2012

(54) POLYCARBONATE PANEL ASSEMBLY FOR A VEHICLE

(75) Inventors: Kedzie Davis Fernholz, New Boston, MI (US); Richard Howard Wykoff, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/901,120

(22) Filed: Oct. 8, 2010

(65) Prior Publication Data

US 2011/0020596 A1   Jan. 27, 2011

Related U.S. Application Data

(62) Division of application No. 12/237,114, filed on Sep. 24, 2008, now Pat. No. 7,828,373.

(51) Int. Cl.
*B32B 19/00* (2006.01)
(52) U.S. Cl. .................................................. 156/272.8
(58) Field of Classification Search ............... 156/272.2, 156/272.8, 99, 108
See application file for complete search history.

(56) References Cited

U.S. PATENT DOCUMENTS

| | | | |
|---|---|---|---|
| 4,881,773 A * | 11/1989 | Ichinose | ................. 296/216.09 |
| 4,948,661 A | 8/1990 | Smith et al. | |
| 4,978,405 A | 12/1990 | Hickman | |
| 5,763,050 A | 6/1998 | Hirmer | |
| 6,183,678 B1 | 2/2001 | Kusuma et al. | |
| 6,210,507 B1 * | 4/2001 | Hansen et al. | ................. 156/109 |
| 6,220,656 B1 | 4/2001 | Martin, Jr. | |
| 6,764,638 B1 | 7/2004 | Matsco et al. | |
| 7,101,611 B2 | 9/2006 | Bravet et al. | |
| 7,128,365 B2 | 10/2006 | Kiesewetter et al. | |
| 7,243,988 B2 | 7/2007 | Wieschermann et al. | |
| 7,622,177 B2 * | 11/2009 | Krause | ........................... 428/57 |
| 2006/0210778 A1 * | 9/2006 | Benyahia et al. | ............. 428/192 |
| 2007/0008736 A1 | 1/2007 | Gasquet | |
| 2010/0007179 A1 | 1/2010 | Fallis et al. | |

* cited by examiner

Primary Examiner — Richard Crispino
Assistant Examiner — Daniel McNally
(74) Attorney, Agent, or Firm — Raymond L. Coppiellie; Brooks Kushman P.C.

(57) ABSTRACT

A vehicle glazing panel assembly has a polycarbonate panel supported by a vehicle body, and has a plurality of peripheral regions. A reinforcement member is mounted to the polycarbonate panel proximate at least one of the plurality of peripheral regions to stiffen the polycarbonate panel. A method of manufacturing a vehicle glazing panel assembly by thermoforming a polycarbonate panel. A reinforcement member is injection molded. The reinforcement member is joined to the polycarbonate panel to stiffen the polycarbonate panel. A vehicle glazing panel assembly is manufactured by a method of thermoforming. A reinforcement member is formed and joined to the polycarbonate panel to stiffen the polycarbonate panel.

18 Claims, 2 Drawing Sheets

POLYCARBONATE PANEL ASSEMBLY FOR A VEHICLE

CROSS-REFERENCE TO RELATED APPLICATIONS

This application is a division of U.S. application Ser. No. 12/237,114 filed Sep. 24, 2008, now U.S. Pat. No. 7,828,373 issued Nov. 9, 2010; the disclosure of which is incorporated in its entirety by reference herein.

BACKGROUND

1. Technical Field

Various embodiments relate to semi-structural polycarbonate panel assemblies for vehicles.

2. Background

Polycarbonate panel assemblies are becoming extremely advantageous in various fields of endeavor, such as in the automotive vehicle field, because polycarbonate glazing has a relatively low weight compared to glass. Replacing glass with polycarbonate glazing, however, often requires either using a substantially thicker piece of polycarbonate or applying a stiffener to the polycarbonate to reach an equivalent stiffness to that of the glass panel it is replacing. The stiffener can be applied to the polycarbonate panel in a two shot molding process. This process, however, requires expensive tooling and specialized molding machines.

SUMMARY

In one embodiment, a vehicle glazing panel assembly is disclosed. The vehicle glazing panel assembly has a polycarbonate panel adapted to be supported by a vehicle body and having a plurality of peripheral regions. A reinforcement member is mounted to the polycarbonate panel proximate at least one of the plurality of peripheral regions to stiffen the polycarbonate panel.

In another embodiment, a method of manufacturing a vehicle glazing panel assembly is provided. A polycarbonate panel having a plurality of regions is thermoformed. A reinforcement member is injection molded. The reinforcement member is joined to the polycarbonate panel proximate at least one of the plurality of regions of the polycarbonate panel to stiffen the polycarbonate panel.

In another embodiment, a vehicle glazing panel assembly is disclosed. The vehicle glazing panel assembly is manufactured by a method including thermoforming a polycarbonate panel having a plurality of regions. A reinforcement member is injection molded. The reinforcement member is joined to the polycarbonate panel proximate at least one of the plurality of regions of the polycarbonate panel to stiffen the polycarbonate panel.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
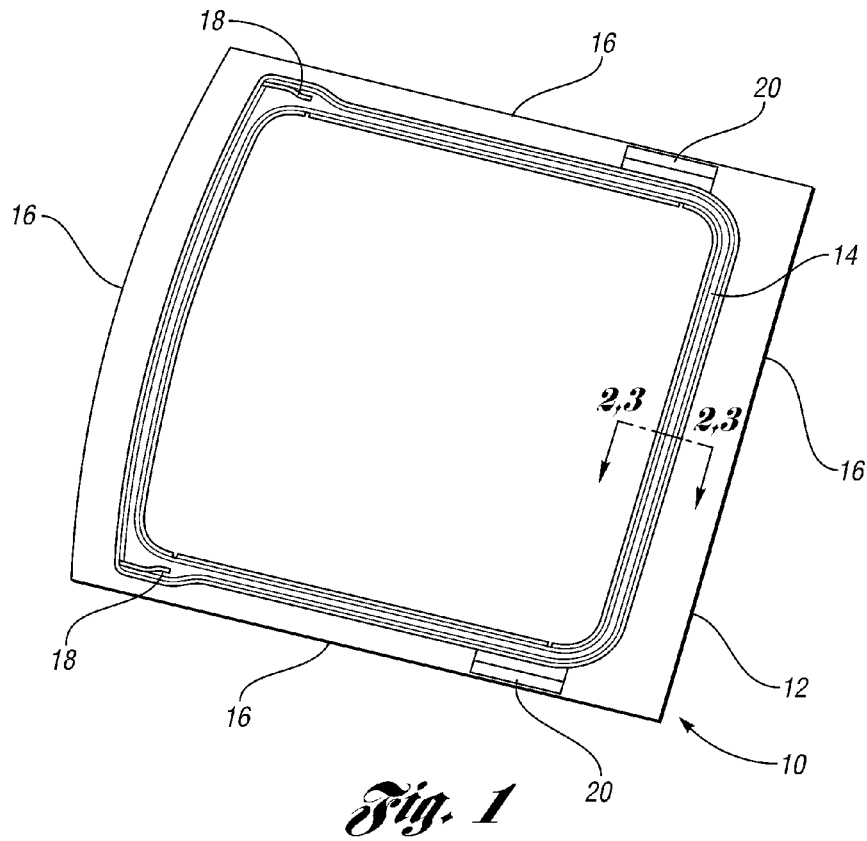
FIG. 1 is a perspective view of a vehicle glazing panel assembly.

One embodiment described herein is shown in FIG. 1. In FIG. 1, a vehicle roof assembly is illustrated and generally referenced by numeral 10. The vehicle roof assembly 10 is adapted to be mounted to a vehicle body to cover a vehicle interior. The vehicle roof assembly 10 may enclose an entire vehicle interior or only a portion of the vehicle interior. The vehicle roof assembly 10 may be adapted to be mounted within the vehicle as a vehicle sunroof assembly. In at least one embodiment, the vehicle roof assembly 10 is adapted to be a side window assembly on a side of a vehicle. In another embodiment, the vehicle roof assembly 10 is adapted to be a liftgate or backlight assembly on a rear end of the vehicle. Of course, the vehicle roof assembly 10 may be any vehicle glazing panel assembly that is a generally flat panel.

Currently, size, complexity and desirability of vehicle roof assemblies continue to grow. Prior art roof assemblies often utilize glass roof assemblies. With increased amounts of glass utilized for the roof assembly, the total vehicle weight and the weight proximate the top of the vehicle both increase when compared to a vehicle with a metal roof assembly. The increased weight caused by the glass roof assembly also increases the center of gravity for the vehicle and decreases vehicle fuel economy. The additional weight of the glass roof assembly can also increase cost of other related systems, such as the suspension. Replacing the glass roof assembly with a polycarbonate panel can reduce the weight of these systems by as much as 30-40%.

A number of technical difficulties prohibit a simple polycarbonate for glass material substitution. One of the main issues is stiffness of the polycarbonate. Since roof panels have relatively little contour, the roof panels should be able to be thermoformed. A thermoformed polycarbonate roof panel, however, will not meet stiffness requirements for the roof assembly without using a substantially thicker panel than the glass it replaces because the material stiffness of polycarbonate is less than the material stiffness of glass and metals. To reproduce the stiffness of glass roof panels with a sufficiently thin polycarbonate roof panel, a ring can be joined on the polycarbonate panel. Consequently, the roof assembly including a polycarbonate panel and a structural back-molded ring can be attempted to be manufactured through multi-shot injection molding.

Unfortunately, injection molds for large, optically transparent polycarbonate roof panels including a structural back-molded ring are expensive compared to tooling cost for glass roof panels. Since roof assemblies are not standard vehicle equipment, amortization of tooling cost over the small volume polycarbonate roof panel output greatly increases individual cost of the roof assembly to a customer. Consequently, implementation of a stiff polycarbonate roof assembly is difficult at an acceptable cost. Therefore, the roof assembly 10 according to the multiple embodiments of the present invention, including the polycarbonate panel 12 and a separately formed reinforcement member 14 joined on the polycarbonate panel 12, is desired.

The polycarbonate panel 12 may be thermoformed into a desired shape. As illustrated in FIG. 1, the polycarbonate panel 12 has a rectangular shape, with four peripheral regions 16. The peripheral regions 16 may be straight or curved. Of course, the polycarbonate panel 12 can have any desired shape and/or size so that the polycarbonate panel 12 can be mounted to different locations on a vehicle.

The reinforcement member 14 may be injection molded separately from the polycarbonate panel 12 and may be formed as one or more separate pieces. As illustrated, the reinforcement member 14 is joined to the polycarbonate panel 12 proximate each of the peripheral regions 16 to increase stiffness of the polycarbonate panel 12.

The reinforcement member 14 is provided proximate each of the four peripheral regions 16 of the polycarbonate panel 12. Joining the reinforcement member 14 to the polycarbonate panel 12 proximate the four peripheral regions 16 increases stiffness of the polycarbonate panel 12 overall.

Figure 2:
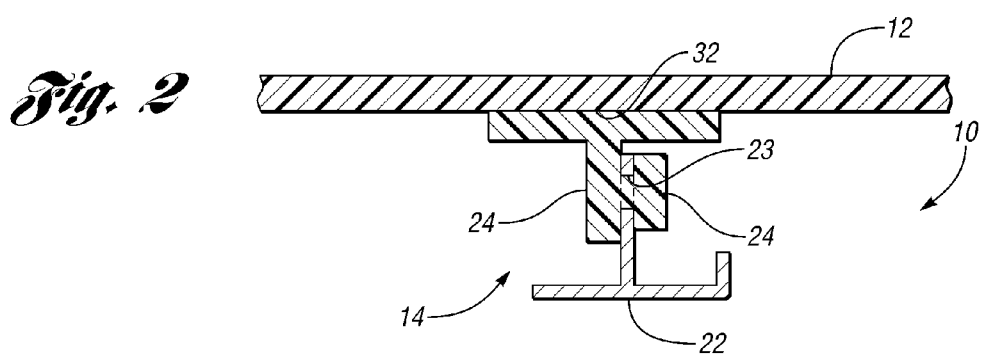
FIG. 2 is a cross-sectional view of a portion of the vehicle glazing panel assembly of FIG. 1 taken along line 2-2.
Figure 3:
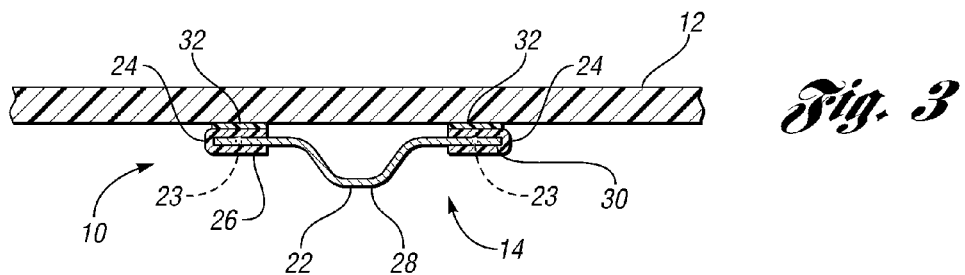
FIG. 3 is a cross-sectional view of a portion of the vehicle glazing panel assembly of FIG. 1 taken along the line 3-3.

As depicted in FIGS. 2-3, the reinforcement member 14 may be formed with a metal layer 22 and one or more thermoplastic or thermoplastic composite layers 24. The metal layer 22 may be formed within only a portion of the reinforcement member 14, as shown in FIG. 2, to locally increase stiffness of the reinforcement member 14 in a desired area of the polycarbonate panel 12. In another embodiment, multiple thermoplastic layers 24 may be over-molded to the metal layer 22, as illustrated in FIG. 3.

Once each of the polycarbonate panel 12 and the reinforcement member 14 is formed, the reinforcement member 14 is joined to the polycarbonate panel 12. In at least one embodiment, the reinforcement member 14 is attached to the polycarbonate panel 12 at attachment joints 32 via laser welding. Laser welding the reinforcement member 14 to the polycarbonate panel 12 presents many benefits. Consumables, such as adhesives, are not necessary to bond the polycarbonate panel to the reinforcement member 14, which reduces both the cost and weights of the vehicle roof assembly 10 when compared to a bonded roof assembly. Quality of the attachment joints 32 between the polycarbonate panel 12 and the reinforcement member 14 can be tested and verified at the time of manufacture, which is not possible if adhesive bonding is utilized. Additionally, the inability to verify the quality of the adhesive bond presents an undesirable potential risk to the customer. Furthermore, surface preparation is not needed prior to joining the reinforcement member 14 to the polycarbonate panel 12, which further reduces cost of the roof assembly 10 compared to a bonded assembly. Also, bonding hardware and other features on the back side of polycarbonate can cause visual defects called bond-line read-through, which is not desired. Laser welding the reinforcement member 14 to the polycarbonate panel 12 does not create this defect. Thus, laser welding the reinforcement member 14 to the polycarbonate panel 12 may present numerous advantages.

As illustrated in FIGS. 2-3, the reinforcement member 14 has a cross-section to provide increased stiffness when attached to the polycarbonate panel 12. In FIG. 2, an embodiment of a cross-section of the reinforcement member 14 attached to the polycarbonate panel 12 is depicted. A first thermoplastic layer 24 is formed having a T-shaped cross-section. A second thermoplastic layer 24 is formed having a rectangular cross-section to be mounted to a portion of the metal layer 22. Of course, any suitable cross-section for the thermoplastic layers 24 is contemplated within the scope of the present invention. The thermoplastic layers 24 can be formed out of polycarbonate through injection molding or extrusion. The metal layer 22 is provided between the thermoplastic layers 24. The metal layer 22 can be joined to the thermoplastic layers 24 in any suitable manner. In the illustrated embodiment, the metal layer 22 has an aperture 23 formed therein so that the first and second thermoplastic layers 24 can be joined directly together with the metal layer 22 provided therearound. The metal layer 22 may have a T-shaped cross-section. Of course, any suitable cross-section for the metal layer 22 is contemplated within the scope of the present invention. As illustrated, the metal layer 22 is a reinforcement, which may provide attachment points for other components.

In FIG. 3, another embodiment of a cross-section of reinforcement member 14 is depicted. The reinforcement member 14 has a first flange 26 that is mounted to the polycarbonate panel 12 at the attachment joint 32. The first flange 26 is connected to an intermediate portion 28 that does not contact the polycarbonate panel 12. The intermediate portion 28 is attached to a second flange 30 that is attached to the polycarbonate panel 12 at the attachment joint 32.

The first flange 26 may be generally parallel with the polycarbonate panel 12 for ease of attachment. In at least one embodiment, the first flange 26 has a curvature corresponding with a curvature of the polycarbonate panel 12. As illustrated, the first flange 26 has a thermoplastic layer 24 provided over a metal layer 22. The metal layer 22 may have an aperture 23 provided therethrough. The aperture 23 may receive a pin therein to secure the thermoplastic layer 24 to the metal layer 22.

The intermediate portion 28 extends from first flange 26 of the reinforcement member 14 to enhance stiffness of the polycarbonate panel 12. In at least one embodiment, the intermediate portion 28 has a curved or angled cross-section. As illustrated, the intermediate portion 28 has a metal layer 22 without a corresponding thermoplastic layer 24.

The second flange 30 is connected to the intermediate portion 28 and may be generally parallel with the polycarbonate panel 12 for ease of attachment. In at least one embodiment, the second flange 30 has a curvature corresponding with a curvature of the polycarbonate panel 12. As illustrated, the second flange 28 has a thermoplastic layer 24 provided over a metal layer 22. The metal layer 22 may have an aperture 23 provided therethrough. The aperture 23 may receive a pin therein to secure the thermoplastic layer 24 to the metal layer 22.

With reference again to the embodiment of the invention applied to a roof module as illustrated in FIG. 1, receptacles 18 can be provided in the reinforcement member 14 that can be sized to receive vehicle components, including but not limited to the vehicle body and a sunroof sunshade roller. In at least one embodiment, the reinforcement member 14 is molded with metal attachment points 18 for sunshade rollers and/or other pertinent attachments.

Figure 4:
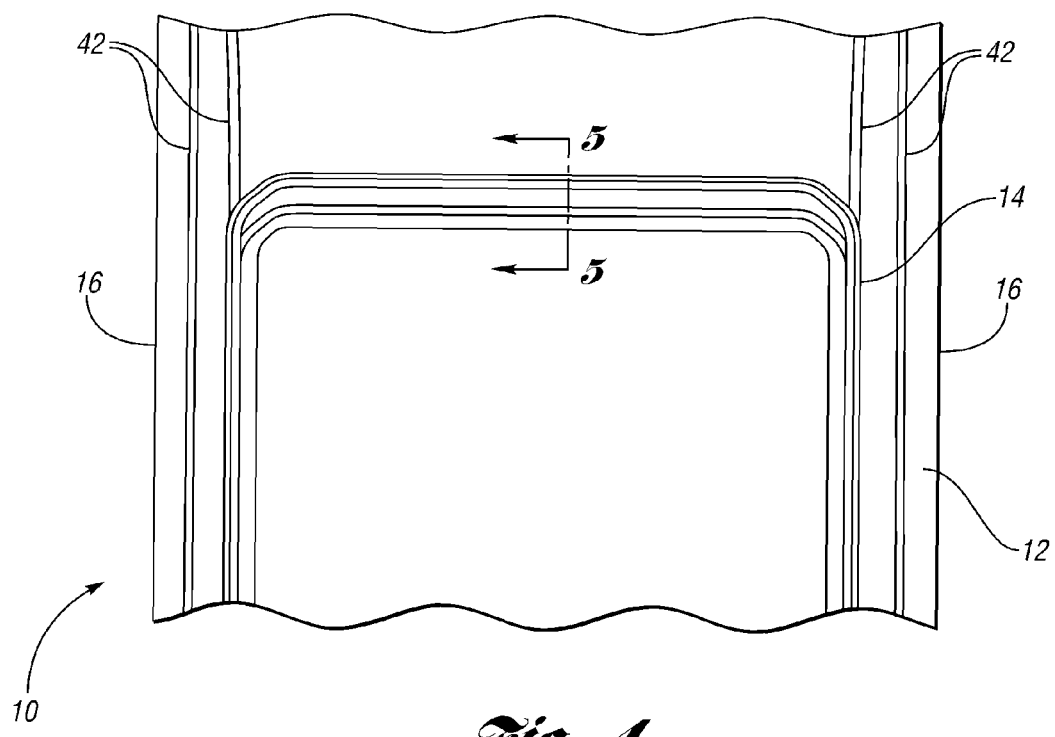
FIG. 4 is a perspective view of another embodiment of a vehicle glazing panel assembly.

Referring now to FIG. 4, another embodiment of the vehicle roof assembly 10 including the polycarbonate panel 12 with the reinforcement member 14 joined thereon. The reinforcement member 14, as illustrated, is provided proximate two peripheral regions 16 to stiffen and support the polycarbonate panel 12.

In at least one embodiment, the reinforcement member 14 is formed out of two or more separate pieces that are joined together. In one embodiment, the reinforcement member 14 has a uniform cross-section. In another embodiment, the reinforcement member 14 has multiple cross-sections that correspond with the two or more separate pieces that are joined together to form the reinforcement member 14.

Figure 5:
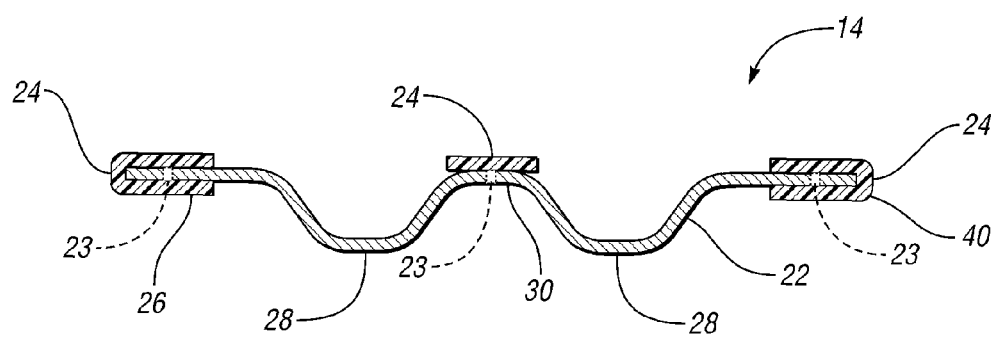
FIG. 5 is a cross-sectional view of a portion of the vehicle glazing panel assembly of FIG. 4 taken along the line 5-5.

In FIG. 5, an embodiment of a cross-section of the reinforcement member 14 of FIG. 4 is illustrated. The reinforcement member 14 has a cross-section to provide increased stiffness when attached to the polycarbonate panel 12. The reinforcement member 14 has a first flange 26 that can be attached to the polycarbonate panel. The first flange 26 is connected to an intermediate portion 28. The intermediate portion 28 is attached to a second flange 30 that can be attached to the polycarbonate panel 12. The second flange 30 is attached to a second intermediate portion 28. A third flange 40 is attached to the second intermediate portion 28. Any amount of intermediate portions 28 and flanges may be provided to increase stiffness of the reinforcement member 14.

Each of the first flange 26, the second flange 30 and the third flange 40 may have a generally flat surface for ease of attachment to the polycarbonate panel 12. Each of the first flange 26, the second flange 30 and the third flange 40 may have a curvature corresponding with a curvature of the polycarbonate panel 12. Each of the first flange 26, the second flange 30 and the third flange 40 provide surfaces to join the reinforcement member 14 to the polycarbonate panel 12. As discussed above, the reinforcement member 14 may be laser welded to the polycarbonate panel 12.

As illustrated, the first flange 26, the second flange 30 and the third flange 40 each have a thermoplastic layer 24 provided over a metal layer 22. On the first flange 26 and the third flange 40, the thermoplastic layer 24 surrounds the metal layer 22. On the second flange 30, the thermoplastic layer 24 is provided on one side of the metal layer 22. The metal layer 22 may have an aperture 23 provided therethrough. The aperture 23 may receive a pin therein to secure the thermoplastic layer 24 to the metal layer 22.

The first intermediate portion 28 extends from first flange 26 to the second flange 30 and the second intermediate portion 28 extends from the second flange 30 to the third flange 40. The first intermediate portion 28 and the second intermediate portion 28 enhance stiffness when attached to the polycarbonate panel 12. In at least one embodiment, each of the intermediate portions 28 has a curved cross-section.

One reinforcement member 14 formed with two or more pieces may have the cross-section depicted in FIG. 3 for one of the two or more pieces and the cross-section depicted in FIG. 5 for another of the two or more pieces of the reinforcement member 14. Of course, the reinforcement member 14 may have any suitable cross-section corresponding to any suitable amount of pieces that are joined together to form the reinforcement member 14.

As depicted in FIG. 4, the polycarbonate panel 12 can have contours 42 formed therein. In one embodiment, the contours 42 are ridges 42 that provide alignment while the reinforcement member 14 is laser welded to the polycarbonate panel 12. In another embodiment, the contours 42 are provided to enhance aesthetics of the vehicle roof assembly 10. In at least one embodiment, the contours 42 do not contact the reinforcement member 14 once the reinforcement member 14 is welded to the polycarbonate panel 12. The contours 42 may be formed into the polycarbonate panel 12, rather than extending beyond a surface of the polycarbonate panel 12. Furthermore, the contours 42 may be formed on only a portion of the polycarbonate panel 12 and may have any desired shape and size.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a vehicle glazing panel assembly comprising:
   thermoforming a polycarbonate panel having a plurality of peripheral regions;
   forming a reinforcement member comprising:
      forming a thermoplastic composite layer;
      providing a metal layer;
      joining the metal layer to the thermoplastic composite layer; and
      forming at least one of the thermoplastic layer and metal layer having a T-shaped cross-section; and
   joining the thermoplastic composite layer of the reinforcement member to the polycarbonate panel proximate at least one of the plurality of peripheral regions to stiffen the polycarbonate panel.

2. The method of manufacturing of claim 1 further comprising:
   forming the thermoplastic composite layer with a pair of spaced apart flanges;
   joining the metal layer to the thermoplastic composite layer along the pair of flanges, the metal layer extending there between.

3. The method of manufacturing of claim 2 further comprising:
   forming the metal layer with at least one concave portion;
   joining the metal layer to the thermoplastic composite layer along the pair of flanges, the concave portion extending therebetween; and
   laser welding the thermoplastic layer to the polycarbonate panel along the pair of flanges so that the concave portion of the metal layer extends away from the polycarbonate panel in order to enhance stiffness of the polycarbonate panel.

4. The method of manufacturing of claim 1 further comprising laser welding the reinforcement member to the polycarbonate panel.

5. The method of manufacturing of claim 1 further comprising:
   providing the metal layer of the reinforcement member adapted to receive hardware to mount components to the polycarbonate panel.

6. The method of manufacturing of claim 1 further comprising laser welding the reinforcement member to the polycarbonate panel proximate at least two of the plurality of peripheral regions.

7. The method of manufacturing of claim 1 providing the metal layer of the reinforcement member with a metal portion without a corresponding thermoplastic composite layer.

8. The method of manufacturing of claim 1 further comprising forming the thermoplastic layer with the T-shaped cross-section.

9. The method of manufacturing of claim 1 further comprising forming the metal layer with the T-shaped cross-section.

10. A method of manufacturing a vehicle glazing panel assembly comprising:
    thermoforming a polycarbonate panel;
    forming a reinforcement member comprising:
       forming a thermoplastic composite layer of the reinforcement member;
       providing an intermediate reinforcing portion of the reinforcement member;

joining the intermediate reinforcing portion of the reinforcement member to at least a portion of the thermoplastic composite layer of reinforcement member; and forming at least one of the thermoplastic layer and the intermediate reinforcing portion having a T-shaped cross-section; and joining the thermoplastic composite layer of the reinforcing member to the polycarbonate panel to stiffen the polycarbonate panel.

11. The method of manufacturing of claim 10 further comprising:

forming the thermoplastic composite layer with a pair of spaced apart flanges;

joining the intermediate reinforcing portion to the thermoplastic composite layer along the pair of flanges, the intermediate reinforcing portion extending therebetween.

12. The method of manufacturing of claim 11 further comprising:

forming the intermediate reinforcing portion with at least one concave portion;

joining the intermediate reinforcing portion to the thermoplastic composite layer along the pair of flanges, the concave portion extending therebetween; and laser welding the thermoplastic layer to the polycarbonate panel along the pair of flanges so that the concave portion of the intermediate reinforcing portion extends away from the polycarbonate panel in order to enhance stiffness of the polycarbonate panel.

13. The method of manufacturing of claim 10 wherein the intermediate reinforcing portion of the reinforcement member is a metal portion without a corresponding thermoplastic layer.

14. The method of manufacturing of claim 10 further comprising laser welding the reinforcement member to the polycarbonate panel.

15. The method of manufacturing of claim 10 comprising forming the thermoplastic layer with the T-shaped cross-section.

16. The method of manufacturing of claim 10 further comprising forming the intermediate reinforcing portion having a with the T-shaped cross-section.

17. A method of manufacturing a vehicle glazing panel assembly comprising:

thermoforming a polycarbonate panel;

forming a reinforcement member comprising:

forming a first thermoplastic composite layer of the reinforcement member;

providing a metal layer of the reinforcement member;

joining the metal layer to the first thermoplastic composite layer;

over-molding a second thermoplastic composite layer to the metal layer;

forming an aperture in the metal layer; and joining the first thermoplastic layer, the second thermoplastic layer and the metal layer directly together through the aperture; and joining the first thermoplastic composite layer to the polycarbonate panel to join the reinforcement member to the polycarbonate panel to stiffen the polycarbonate panel.

18. The method of manufacturing of claim 17 further comprising laser welding the first thermoplastic composite layer to the polycarbonate panel.

* * * * *